(No Model.)

U. ANDRÉ & O. DURAND.
COCK OR TAP.

No. 476,113. Patented May 31, 1892.

Witnesses:
Inventors:

UNITED STATES PATENT OFFICE.

ULYSSE ANDRÉ AND OLIVIER DURAND, OF BARCELONA, SPAIN.

COCK OR TAP.

SPECIFICATION forming part of Letters Patent No. 476,113, dated May 31, 1892.

Application filed February 15, 1892. Serial No. 421,648. (No model.) Patented in France November 27, 1891, No. 217,497.

*To all whom it may concern:*

Be it known that we, ULYSSE ANDRÉ and OLIVIER DURAND, engineers, of Barcelona, Spain, have invented a new Improvement in Cocks or Taps, (for which we have obtained Letters Patent of France for fifteen years, No. 217,497, dated November 27, 1891;) and we do hereby declare the nature of this invention and in what manner the same is to be performed to be particularly described and ascertained in and by the following statement.

With cocks or taps as usually constructed the plugs are liable to offer resistance to the power applied for opening or closing them, because the plug enters too far into the casing. This frequently necessitates striking upon the lower portion of the plug in order to diminish the amount of friction between the plug and the casing.

The object of our invention is to produce a cock or tap in which such gripping is impossible and in which the extent of penetration of the plug into the casing is maintained constant by the use of springs.

Reference is to be had to the accompanying drawings, forming a part of this specification, in which similar letters of reference indicate corresponding parts in all the figures.

Figure 1:
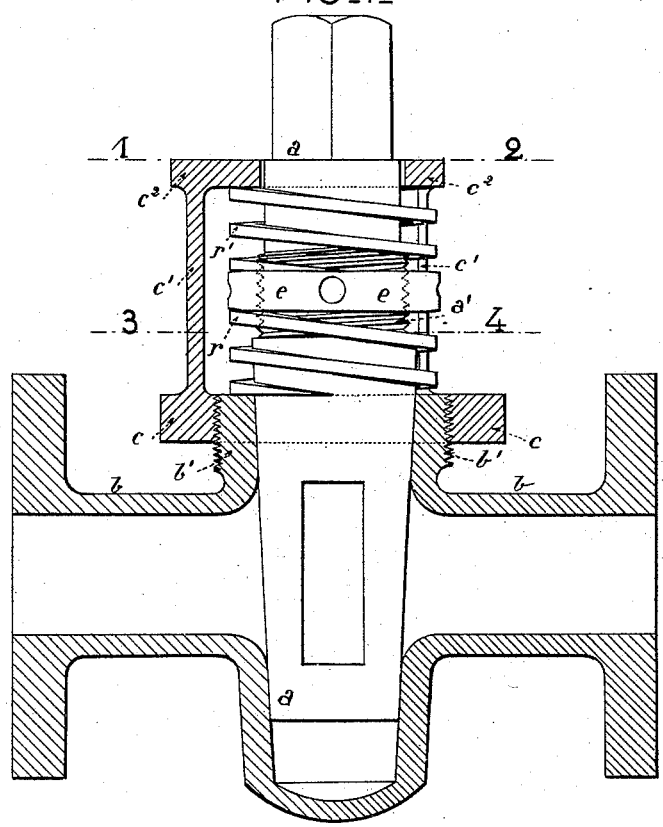
Figure 2:
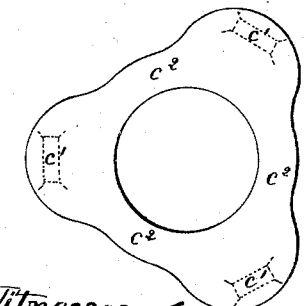
Figure 3:
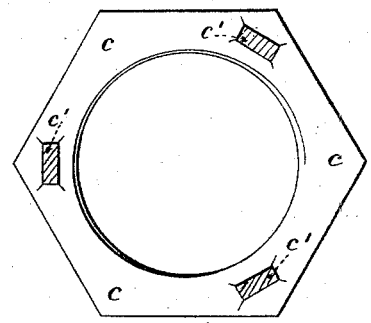

Figure 1 is a central longitudinal section of a cock constructed in accordance with our invention. Fig. 2 is a plan of the abutting washer and support on the line 1 2 in Fig. 1, and Fig. 3 is a cross-section of the same on the line 3 4 in Fig. 1.

The plug $a$ is of the common construction, except that it has a threaded portion $a'$, and the plug enters the cock-casing $b$, which casing is threaded exteriorly adjacent to the plug, as shown at $b'$, so as to receive a nut $c$, which nut has projecting from three sides thereof and from its outer face the parallel bars $c'$, which terminate at their outer ends in a plate $c^2$, which fits the plug and serves as an abutment for one of the pressure-springs which encircle the plug. A circular nut $e$ is screwed upon the threaded portion $a'$ of the plug, the nut having holes therein to facilitate the attachment of a pin-wrench or pointed instrument to it, and between the nut $e$ and the entrance to the casing is a spring $r$, which encircles the plug, while a spring $r'$ encircles the plug on the outside of the nut $e$ and between the nut and the plate $c^2$. These springs $r$ and $r'$ are of equal tension and by pressing upon the nut $e$ serve to hold the plug $a$ in a constant endwise position.

The cock is put together as follows: The plug $a$ having first been placed in the position it is to occupy in the casing $b$, with the springs $r\ r'$ surrounding its stem, the nut $c$, with the washer $c^2$, is screwed upon the casing at $b'$, and the nut $e$ on the plug-stem is set at equal distances from the part $b'$ of the casing and the plate $c^2$. When the cock has been put together, the springs $r$ and $r'$, being of equal power, will keep the nut $e'$, and consequently the plug $a$, in a constant position in an endwise direction. This position may be readily varied by adjusting the position of the nut, for, as will be obvious, if the nut $c$ be screwed in one direction the plug will be caused to move into and fit the casing more tightly, and if it be screwed in a reverse direction a contrary effect will be produced.

Having thus described our invention, we claim as new and desire to secure by Letters Patent—

1. In a cock or tap, the combination, with a plug, of springs arranged to act in opposite directions on the plug and means for causing the springs to act equally or unequally on the said plug, substantially as described.

2. The combination, with the plug and tap, of a nut screwed to the plug-stem, springs encircling the plug-stem on opposite sides of the nut, and abutments for the ends of the springs opposite the nut, substantially as shown and described.

3. The combination, with the cock-casing and plug, of a nut screwed to the casing so as to encircle the plug, a plate connected with the nut, a nut secured to the plug-stem, and springs encircling the plug-stem between its nut and the casing and between its nut and the plate, substantially as shown and described.

In witness whereof we have hereunto set our hands in presence of two witnesses.

ULYSSE ANDRÉ.
OLIVIER DURAND.

Witnesses:
AUGUSTE SCHWICH,
AUGUSTE BURGALEB.